United States Patent Office.

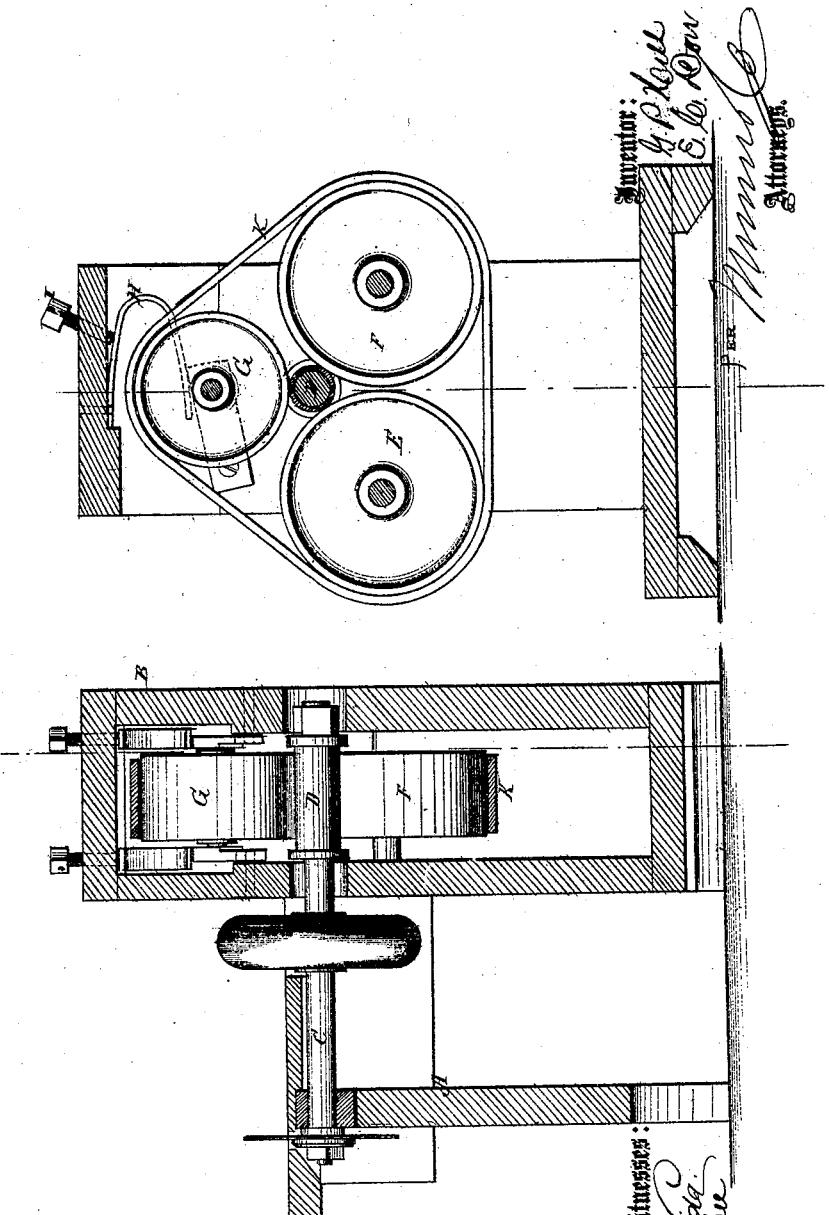

GILBERT P. HILL AND EDWARD C. DOW, OF EAST DEERING, NEW HAMPSHIRE.

Letters Patent No. 103,459, dated May 24, 1870.

IMPROVEMENT IN SAWING-MACHINE.

The Schedule referred to in these Letters Patent and making part of the same.

To all whom it may concern:

Be it known that we, GILBERT P. HILL and EDWARD C. DOW, of East Deering, in the county of Hillsborough and State of New Hampshire, have invented a new and useful Improvement in Hand Sawing-Machine; and we do hereby declare that the following is a full, clear, and exact description thereof, which will enable others skilled in the art to make and use the same, reference being had to the accompanying drawing forming part of this specification.

This invention relates to an improved arrangement of driving mechanism for the arbors of hand sawing-machines, and consists in journaling one end of the arbor between the peripheries of three friction-wheels, one of which, preferably the upper one, is arranged in movable bearings, and provided with springs to press it upon the journal of the arbor, and all have a belt working over them.

The power is applied by hand-crank, preferably to one of the wheels in fixed bearings.

Figure 1 is a sectional elevation of my improved machine, and

Figure 2 is another sectional elevation, taken at right angles to that of fig. 1.

Similar letters of reference indicate corresponding parts.

A is the saw-bench, and

B, a vertical extension thereof at one side, arranged to provide a hollow space for inclosing the operating-gears.

C is the saw-mandrel, provided with a balance-wheel, and with a large friction-journal, D, at the end, for applying the power.

This end is journaled on the peripheries of the two wheels F F, placed in fixed bearings, and forced down upon them by the friction-wheel G, placed in bearings capable of moving up and down.

The bearings of this wheel are acted on by springs H, to confine the journal D so that it will not slip when moving slow, and having great force applied to it, as is required in hand sawing.

The springs H are provided with temper-screws I, for varying their tension.

K is an endless belt placed over all the wheels, and intended to communicate the power of the one operated by the crank to the others, so that they will act equally on the arbor, and divide the transmission of power between the three points of contact of the said wheels with the arbor.

By this arrangement the transmission of power to the arbor through friction-wheels is made very effective and reliable.

The same arrangement may be applied for driving other apparatus.

Having thus described my invention,

I claim as new and desire to secure by Letters Patent—

A pair of friction-wheels, F F, to support the saw-driving shaft C D, combined with a third wheel, G, provided with spring-adjusters, bearing and resting upon, and holding the said shaft in position, as set forth.

GILBERT P. HILL.
EDWARD C. DOW.

Witnesses:
D. P. WOODBURY,
WM. WOODBURY.